United States Patent [19]

Kinsman et al.

[11] Patent Number: 5,461,015
[45] Date of Patent: Oct. 24, 1995

[54] HIGH STRENGTH PORCELAIN AND METHOD THEREFOR

[75] Inventors: Karin M. Kinsman, San Mateo; Ryan W. Dupon, San Carlos; Martha L. McCrum, Sunnyvale; Linas Mazeika, San Carlos; Amy S. Chu, Oakland, all of Calif.

[73] Assignee: Raychem Corporation, Menlo Park, Calif.

[21] Appl. No.: 297,451

[22] Filed: Aug. 29, 1994

[51] Int. Cl.⁶ .................................. C04B 33/26
[52] U.S. Cl. .................. 501/141; 501/143; 501/144; 501/153; 501/154; 264/56
[58] Field of Search .................. 501/141, 142, 501/143, 144, 153, 154; 264/56

[56] References Cited

U.S. PATENT DOCUMENTS

| | | | |
|---|---|---|---|
| 2,898,217 | 8/1959 | Seising | 106/46 |
| 3,097,101 | 7/1963 | Lester | 106/46 |
| 3,431,126 | 3/1969 | Fukui | 106/46 |
| 3,459,567 | 8/1969 | Yamamoto et al. | 106/46 |
| 3,585,056 | 6/1971 | Bush | 501/141 |
| 3,674,519 | 7/1972 | Higuchi et al. | 106/46 |
| 3,758,318 | 9/1973 | Farris et al. | 106/65 |
| 3,846,098 | 11/1974 | Nakashima et al. | 65/18 |
| 3,860,432 | 1/1975 | Higuchi et al. | 106/46 |
| 4,183,760 | 1/1980 | Funk et al. | 106/46 |
| 4,697,222 | 9/1987 | Kaneko et al. | 361/321 |
| 4,717,695 | 1/1988 | Oda | 501/143 |
| 4,900,702 | 2/1990 | Tsuboi et al. | 501/134 |
| 4,983,556 | 1/1991 | Seike et al. | 501/143 |
| 4,988,650 | 1/1991 | Takagi et al. | 501/134 |
| 5,070,050 | 12/1991 | Dupon et al. | 501/108 |
| 5,102,719 | 4/1992 | Kumagai et al. | 428/209 |
| 5,130,280 | 7/1992 | Dupon et al. | 501/108 |
| 5,185,304 | 2/1993 | Hirai et al. | 501/139 |
| 5,188,886 | 2/1993 | Dupon et al. | 428/209 |
| 5,200,369 | 4/1993 | Clifford et al. | 501/66 |
| 5,244,848 | 9/1993 | Clifford et al. | 501/66 |
| 5,264,398 | 11/1993 | Thometzek et al. | 501/21 |
| 5,264,403 | 11/1993 | Abe et al. | 501/139 |
| 5,304,516 | 4/1994 | Clifford | 501/21 |

OTHER PUBLICATIONS

Bever, *Encyclopedia of Materials Science and Engineering*, vol. 5, p. 3815 (Pergamon Press–MIT Press (1986).
O'Bannon, *Dictionary of Ceramic Science and Engineering*, p. 195 (Plenum 1984).
Kingery et al., *Introduction to Ceramics*, 2nd Ed. pp. 13–14, 106–107, 361–364, 549–551 (John Wiley & Sons 1976).
O'Bannon, "Dictionary of Ceramic Science & Engineering", 1984, Plenum Press, p. 29.

*Primary Examiner*—Mark L. Bell
*Assistant Examiner*—Michael Marcheschi
*Attorney, Agent, or Firm*—Herbert G. Burkard; Yuan Chao

[57] ABSTRACT

A porcelain having 9 to 55% by weight of $SiO_2$, 36 to 87% by weight of $Al_2O_3$, 0 to 2.0% by weight of $Fe_2O_3$, 0 to 1.0% by weight of $TiO_2$, 0 to 0.5% by weight of CaO, 0 to 0.5% by weight of MgO, 1.0 to 4.0% by weight of $K_2O$ and $Na_2O$ combined, and 0.25 to 25.0% by weight of bismuth oxide is disclosed. The porcelain has unexpectedly high unglazed bending strength and may be used for dielectric and structural applications.

3 Claims, No Drawings

HIGH STRENGTH PORCELAIN AND METHOD THEREFOR

TECHNICAL FIELD OF THE INVENTION

This invention relays to high strength porcelains and methods for their manufacture.

Porcelain materials are typically made by shaping the precursor materials into a green body and firing the green body to convert it into a porcelain. The precursor materials may include alumina, clay, and a fluxing material such as feldspar or nepheline syenite. There has been much activity aimed at developing porcelain compositions which have higher strengths or are easier to prepare, for example by lowering the firing temperatures. Oda, U.S. Pat. No. 4,717,695 (1988), discloses porcelains having unglazed bending strengths greater than 1400 kg/cm$^2$ prepared from corundum, bauxite, clay, feldspar, and optionally quartz. However, two high temperature steps, a calcining one at 900–1400° C. and a firing one at 1100–1400 ° C. are needed.

SUMMARY OF THE INVENTION

We have discovered that by using a bismuth fluxing material, porcelains of higher strength unexpectedly can be obtained while at the same time permitting a simpler and/or lower temperature firing process.

Accordingly, this invention also provides a method of making a porcelain, comprising the steps of:

(a) forming a mixture comprising (i) 5 to 80% by weight of alumina, (ii) 10 to 80% by weight of clay, (iii) 9 to 25% by weight of fluxing material selected from the group consisting of bismuth-containing fluxing material, bismuth-free fluxing material and combinations thereof, provided that the amount of bismuth-containing fluxing material is at least 0.2% by weight; all the weight %'s being based on the combined weights of alumina, clay, and fluxing material;

(b) forming the mixture into a shaped article; and (c) firing the shaped article to convert the mixture into porcelain.

This invention also provides a porcelain comprising 9 to 55% by weight of SiO$_2$, 36 to 87% by weight of Al$_2$O$_3$, 0 to 2.0% by weight of Fe$_2$O$_3$, 0 to 1.0% by weight of TiO$_2$, 0 to 0.5% by weight of CaO, 0 to 0.5% by weight of MgO, 1.0 to 4.0% by weight of K$_2$O and Na$_2$O combined, and 0.25 to 25.0% by weight of bismuth oxide, the percentages being based on the combined weights of SiO$_2$, Al$_2$O$_3$, Fe$_2$O$_3$, TiO$_2$, CaO, MgO, K$_2$O, Na$_2$O, and bismuth oxide.

DESCRIPTION OF THE PREFERRED EMBODIMENTS

This invention advantageously permits the fabrication of higher strength porcelains by processes which are more forgiving than prior art ones. The inclusion of a bismuth-containing fluxing material unexpectedly results in a porcelain having higher strengths than the corresponding materials made without the bismuth-containing fluxing material under the same conditions. The results are obtained over a wide range of alumina content and over a wide range of firing temperatures and regimens. The bismuth-containing fluxing material also enables in some instances the attainment of high strengths at lower firing temperatures. In other instances, the high strengths are difficult or impossible to obtain in the corresponding bismuth-free formulations without resorting to tightly controlled firing conditions. In other instances, especially where the amount of alumina is high (greater than 55% by weight), the high strengths are difficult to obtain regardless of the firing conditions unless a bismuth-containing fluxing material is used.

As stated above, porcelains of this invention comprises 9 to 55% by weight of SiO$_2$, 36 to 87% by weight of Al$_2$O$_3$, 0 to 2.0% by weight of Fe$_2$O$_3$, 0 to 1.0 % by weight of TiO$_2$, 0 to 0.5% by weight of CaO, 0 to 0.5% by weight of MgO, 1.0 to 4.0% by weight of K$_2$O and Na$_2$O combined, and 0.25 to 25.0% by weight of bismuth oxide. Preferably, the porcelain consists essentially of the foregoing components, that is, it is essentially free of other materials. The presence of Fe$_2$O$_3$, TiO$_2$, CaO, and MgO is theoretically optional, but because normally they are present as unavoidable impurities in the precursor materials, they are usually present in the final porcelain. The K$_2$O and Na$_2$O come mainly from the fluxing material, but a small amount also comes from the clay and the alumina. Without being bound by such theory, it is believed that the porcelain has corundum and mullite crystalline phases in a glassy matrix.

Unglazed bending strengths were measured using a standard three-point bending test. Porcelains of this invention preferably have unglazed bending strengths of at least 2000 kg/cm$^2$, more preferably at least 2800 kg/cm$^2$. Although our measurements were made with samples of various sizes, results were confirmed to be reliable and reproducible when selected samples were remeasured with 12 mm (0.5 inch) extruded rods which are normally used for such measurements.

The term "porcelain," as used herein, is a ceramic which is prepared from clay (e.g., Al$_2$Si$_2$O$_5$(OH)$_4$), a fluxing material, and alumina. The porcelains of this invention also include bismuth oxide derived from the fluxing material. The bismuth fluxing material, in addition to facilitating the firing process by lowering the requisite temperature, contributes to the attainment of high bending strengths.

The bismuth-containing fluxing material may be either bismuth oxide (typically Bi$_2$O$_3$) or a compound pyrolyzable to bismuth oxide. Regarding the latter, any finely dispersed bismuth compound which is so pyrolyzable may be used. Exemplary ones include, without limitation, bismuth subcarbonate (Bi$_2$O$_2$(CO$_3$)), bismuth subnitrate (Bi$_2$O$_2$(NO$_3$)$_2$), bismuth oxychloride, bismuth nitrate, bismuth chloride, bismuth sulfate, bismuth oxalate, bismuth hydroxide, and the like. Bismuth subcarbonate is especially preferred. It is believed that the bismuth subcarbonate can be more effectively dispersed, making it a better sintering aid. The amount of bismuth containing fluxing material to be used is at least 0.2% by weight, up to maximum of 25% by weight (that is, all the fluxing material is bismuth-containing). A preferred range is between 0.5 and 15% by weight. Combinations of the bismuth oxide and the pyrolyzable compound may be used.

The bismuth-free fluxing material may be a feldspar, nepheline syenite, or other fluxing material conventionally used in the ceramic arts. Feldspars are anhydrous aluminosilicates containing K$^+$, Na$^+$, or Ca$^{+2}$ ions which aid in the formation of a glass phase. The preferred feldspar is potash (K$^+$) feldspar, or KAlSi$_3$O$_8$. (Herein, the identification of a feldspar as being of a given type (e.g., "potash feldspar") means that it has a predominance of the correspondingly specified ion (in this instance, K$^+$). It does not mean that the other ions (Na$^+$, Ca$^{+2}$) must be entirely or even substantially absent.)

The alumina preferably is corundum (α-alumina). The alumina typically has a purity of about 99.8%, with the main impurity being $Na_2O$. Particle size is not especially critical. Typically, we have used alumina with an average particle size of between 2 and 10 μm, although alumina with larger or smaller average particle sizes may be used. During the fabrication process, the particle size may be further reduced and agglomerates are broken up. The alumina is used in an amount of between 10 and 80, preferably 25 and 75%, by weight.

Clays are hydrous alumino silicates which develop plasticity when mixed with water. They may additionally contain small amounts of impurities such as quartz, $Fe_2O_3$, $TiO_2$, CaO, MgO, $K_2O$ or $Na_2O$. The clay may be china clay, bentonite, ball clay, and the like, or a mixture thereof. Ball clays have smaller particle sizes than china clays and therefore are more plastic. However, they tend to have more impurity ions and organic matter. Because china clay is not as highly plastic, it can be mixed with ball clay to make it easier to mold. Generally, the selection of the type of clay (or clay mixture) is governed by processabilty considerations. We have found that the type of clay or clay mixture has little effect on the mechanical properties of the resultant porcelain. The clay is used in an amount of between 10 and 80, preferably 12.5 and 60%, by weight.

The bismuth compound may be finely dispersed or coated over the other component materials by wet milling. A ball mill may be used to produce an intimate mixture of the precursor materials, which can then be dewatered by filter pressing. To illustrate, all the precursor materials except the clay may be milled until at least about 98% of the particles are less than 10 μm in effective spherical diameter. The milling time varies depending on the density of the milling media, the amount of milling media, the ratio of water to solids, the total loading of the mill, and the milling speed. The clay is then added and the mixture is subjected to further milling until the desired particle size distribution is reached. Dewatering may also be effected by other methods, such as rotary evaporation or spray drying. The precursor materials may be ground to create a homogeneous mixture of the components. Generally, smaller particle sizes are preferred, subject to the limitation that mixtures with extremely small particle sizes are difficult to extrude. Other comminution techniques may be used.

Other mixing techniques may be used, for example by precipitation of the bismuth onto a suspension of the other components. Suitable precipitation techniques are disclosed in Dupon et al., U.S. Pat. No. 5,070,050 (1991), the disclosure of which is incorporated herein by reference.

The dewatered intimate mixture is then shaped, for example by extrusion, into a desired shaped article, or green body. The green body is then sintered (or fired) to convert the intimate mixture into porcelain material. While we do not wish to be bound by any theory, it is our belief that the bismuth compound, when heated, is converted to an oxide of bismuth which melts and acts as a liquid phase sintering aid which reacts with the clay and other fluxing material to promote densification and produce a dense porcelain. An advantage of our invention is that sintering or firing can be effected at a relatively low temperature. The temperature is preferably between 1100° and 1300 ° C., more preferably between 1150° and 1260 ° C. Some experimentation with the minimum temperature required to attain the desired properties in the porcelain for a given formulation may be needed. The sintering time is not particularly critical, provided it is of sufficient duration. Once the ceiling temperature has been attained, the sample is held there for between about 0 and about 12 hr. Longer times may be used. There may be some variation in the time required, depending on the sintering temperature, the particle size of the porcelain precursor material, the amount of bismuth compound present, etc., as may be readily empirically determined. As is well known in the art, the sintering process may be according to a complex heating schedule. In such instances, a complex heating schedule, with the initial heating stages at a lower temperature, for example at 200° to 700 ° C. for 1–20 hr., is recommended to ensure removal of volatiles (e.g., water from clay and carbon dioxide from bismuth subcarbonate).

The process of this invention is advantageous in that only a single high temperature treatment is required. All the precursor materials may be milled in the same mill and discharged only once, instead of unloading the mill to calcine the materials and then reloading them to remill and mix with the clay. Porcelain made according to this invention can be used for all the applications for which porcelains are used, including insulators and structural ceramics.

The practice of our invention may be further understood by reference to the following examples, which are provided by way of illustration and not of limitation.

EXAMPLE 1

Corundum, potash feldspar, clay (a combination of china and ball clays), and bismuth subcarbonate, in the amounts indicated in Table 1 below, were added to an 1.0 L mill jar with 1100 g Burundum cylindrical milling media, 200 g deionized water and about 4 g Darvan™ 7 dispersant. After ball milling for about 48 hr., the slurry was dried by rotary evaporation, ground, sieved (80 mesh screen) and uniaxially pressed at about 879 kg/cm² (12.5 kpsi) into 5.1 cm (2 inch) diameter discs. The discs were fired at maximum temperatures ranging from 1150 to 1300 ° C. and held there for 2 to 6 hr. The heating and cooling rates were as follows:

| | |
|---|---|
| 30 to 100° C. | at 70° C./hr |
| 100 to 450° C. | at 100° C./hr |
| 450 to 700° C. | at 50° C./hr |
| 700° C. to maximum temperature | at 100° C./hr |
| Maximum temperature to 300° C. | at 120° C./hr |

Three-point bending tests specimens were sliced from the discs (1 mm thick×3 mm wide) with a diamond saw and tested. X-ray diffraction of the porcelains indicated corundum and mullite as the only crystalline phases present. The results are summarized in Table 1.

TABLE 1

| Sample | Corundum[a] | China Clay[a] | Ball Clay[a] | Feldspar[a] | Bismuth Subcarbonate[a] | Max. Temp. (time) (°C., hr) | Bending Strength (kg/cm²) |
|---|---|---|---|---|---|---|---|
| 1 | 10 | 48.8 | 23.5 | 17.7 | 0 | 1150 (6) | 1864 |
| | | | | | | 1200 (6) | 1919 |

TABLE 1-continued

| Sample | Corundum[a] | China Clay[a] | Ball Clay[a] | Feldspar[a] | Bismuth Subcarbonate[a] | Max. Temp. (time) (°C., hr) | Bending Strength (kg/cm$^2$) |
|---|---|---|---|---|---|---|---|
|  |  |  |  |  |  | 1260 (0) | 2234 |
| 2 | 10 | 48.8 | 23.5 | 14.75 | 2.95 | 1150 (6) | 2409 |
|  |  |  |  |  |  | 1200 (6) | 2170 |
|  |  |  |  |  |  | 1260 (0) | 2363 |
| 3 | 10 | 48.8 | 23.5 | 11.8 | 5.9 | 1150 (6) | 2300 |
|  |  |  |  |  |  | 1200 (6) | 2265 |
|  |  |  |  |  |  | 1260 (0) | 2375 |
| 4 | 43 | 12.7 | 25.3 | 12.7 | 6.3 | 1150 (2) | 3065 |
| 5 | 43 | 12.7 | 25.3 | 9.5 | 9.5 | 1200 (6) | 2974 |
| 6 | 45 | 23 | 12 | 20 | 0 | 1150 (6) | 2411 |
| 7 | 45 | 23 | 12 | 15 | 5 | 1150 (6) | 3466 |
| 7[a] | 45 | 23 | 12 | 15[b] | 5 | 1150 (6) | 3200 |
| 8 | 46.3 | 37 | 0 | 11.5 | 5.2 | 1150 (6) | 3388 |
|  |  |  |  |  |  | 1200 (6) | 3487 |
| 9 | 46.3 | 24 | 13 | 11.5 | 5.2 | 1150 (6) | 3560 |
|  |  |  |  |  |  | 1200 (6) | 3523 |
| 10 | 47 | 23 | 12 | 12 | 6 | 1150 (6) | 3353 |
| 11 | 50 | 10.7 | 21.3 | 12 | 6 | 1200 (2) | 2967 |
| 12 | 50 | 21.3 | 10.7 | 9 | 9 | 1150 (6) | 3381 |
| 13 | 60 | 16 | 9 | 9 | 6 | 1200 (6) | 3332 |
|  |  |  |  |  |  | 1300 (6) | 3395 |
| 14 | 60 | 14 | 8 | 10 | 8 | 1200 (6) | 3367 |
| 15 | 70 | 12 | 6 | 8 | 4 | 1200 (6) | 2896 |
| 16 | 70 | 10 | 5 | 9 | 6 | 1200 (6) | 3248 |

[a]Relative parts by weight, based on a total weight of 230 g
[b]Nepheline syenite It is noted that in Sample 1, a control sample in which no bismuth subcarbonate was used, the bending strength was relatively low.

EXAMPLE 2

The starting materials were the same as in Example 1, in the proportions set forth in Table 2. The non-plastic materials (corundum, feldspar, and bismuth subcarbonate) were added to a 1.0 L mill jar together with 1100 g Burundum cylindrical milling media and 185 g deionized water. After ball milling for 24 hr., the clays were added with an additional 15 g deionized water and about 4 g Darvan® 7 dispersant. The slurry was milled for another 5 hr. The slurry was dried by rotary evaporation, ground, sieved (80 mesh screen) and uniaxially pressed at about 879 kg/cm$^2$ (12.5 kpsi) into 2 inch diameter discs. The discs were fired at maximum temperatures ranging from 1150° to 1260° C. and held at the maximum temperature for 0 to 6 hr. The heating and cooling rates were as specified for Example 1, except that for samples fired at 1260° C. the firing schedule was: 32 to 300° C. in 4 hr., 300° C. to 570° C. in 8 hr., 570° to 900° C. in 8 hr., 900° to 1260° C. in 9 hr., 1260° to 800° C. in 8 hr., and 800° to 32° C. in 25 hr. Three point bending tests were performed as specified in Example 1. Again, x-ray diffraction confirmed the presence of corundum and mullite as the only crystalline phases. The results are summarized in Table 2.

TABLE 2

| Sample | Corundum[a] | Clay[a,b] | Feldspar[a] | Bismuth Subcarbonate[a] | Max. Temp (time at temp.) (°C., hr) | Bending Strength (kg/cm²) |
|---|---|---|---|---|---|---|
| 17 | 45 | 35 | 7 | 13 | 1150 (6) | 2988 |
| 18 | 45 | 35 | 10 | 10 | 1150 (6) | 3023 |
| 19 | 45 | 35 | 13 | 7 | 1150 (6) | 2981 |
|    |    |    |    |    | 1200 (6) | 3445 |
| 20 | 45 | 35 | 14 | 6 | 1150 (6) | 2966 |
|    |    |    |    |    | 1200 (6) | 3465 |
| 21 | 45 | 35 | 15 | 5 | 1150 (6) | 2897 |
|    |    |    |    |    | 1200 (6) | 3128 |
|    |    |    |    |    | 1260 (0) | 3347 |
| 22 | 45 | 35 | 16 | 4 | 1150 (6) | 2841 |
|    |    |    |    |    | 1200 (6) | 3135 |
|    |    |    |    |    | 1260 (0) | 3656 |
| 23 | 45 | 35 | 17 | 3 | 1150 (6) | 2974 |
|    |    |    |    |    | 1200 (6) | 3L% |
|    |    |    |    |    | 1260 (0) | 3100 |
| 24 | 45 | 35 | 18 | 2 | 1150 (6) | 2580 |
|    |    |    |    |    | 1200 (6) | 3066 |
| 25 | 45 | 35 | 19 | 1 | 1150 (6) | 2201 |
|    |    |    |    |    | 1200 (6) | 2819 |
|    |    |    |    |    | 1260 (0) | 2833 |
| 26 | 45 | 35 | 19.5 | 0.5 | 1150 (6) | 2248 |
|    |    |    |    |    | 1200 (6) | 2587 |
|    |    |    |    |    | 1260 (0) | 2854 |
| 27 | 45 | 35 | 20 | 0 | 1150 (6) | 1736 |
|    |    |    |    |    | 1200 (6) | 2707 |
|    |    |    |    |    | 1260 (0 | 3053 |
| 28 | 50 | 32 | 13.5 | 4.5 | 1150 (6) | 3403 |
|    |    |    |    |    | 1260 (0) | 3115 |
| 29 | 50 | 32 | 18 | 0 | 1150 (6) | 2643 |
|    |    |    |    |    | 1260 (0) | 2756 |
| 30 | 55 | 28 | 12.75 | 4.25 | 1150 (6) | 3002 |
|    |    |    |    |    | 1260 (0) | 3220 |
| 31 | 55 | 28 | 17 | 0 | 1150 (6) | 2362 |
|    |    |    |    |    | 1260 (0) | 3044 |
| 32 | 60 | 23.5 | 12.4 | 4.1 | 1150 (6) | 3079 |
|    |    |    |    |    | 1260 (0) | 3403 |
| 33 | 60 | 23.5 | 16.5 | 0 | 1150 (6) | 1919 |
|    |    |    |    |    | 1260 (0) | 2397 |
| 34 | 65 | 21 | 10.5 | 3.5 | 1150 (6) | 2953 |
|    |    |    |    |    | 1260 (0) | 2932 |
| 35 | 65 | 21 | 10.5 | 3.5 | 1150 (6) | 2953 |
|    |    |    |    |    | 1260 (0) | 2545 |

[a]Relative parts by weight, based on a total weight of 230 g.
[b]Mixture of china and ball clays.

EXAMPLE 3

Corundum (25 wt %), potash feldspar (10 wt %), clay (57.5 wt %), and a bismuth-containing fluxing material (7.5 wt %) were added to a 1.0 L jar mill with 1300 g Burundum cylindrical grinding media, 250 g deionized water, and 4 g Darvan™ 7 dispersant. The wt % of the bismuth-containing fluxing material was calculated based on an equivalent amount of bismuth trioxide. The total amount of solid ingredients was about 238 g. After ball milling the formulation for 48 hr., the slurry is dried by rotary evaporation, hand ground, sieved using an 80 mesh screen and uniaxially pressed to 879 kg/cm² (12.5 kpsi) into 5.1 cm diameter discs. The discs were fired from 25° C. to 1100° C. at a rate of 135° C./hr., held at 110° C. for 12 hr., and cooled to room temperature at 135° C./min. Three-point bending test specimens were cut from the fired discs (1 mm thick×3 m wide) using a diamond saw and tested to failure. The results are summarized in Table 3.

TABLE 3

| Sample | Bismuth Fluxing Material | Bending Strength (kg/cm²) |
|---|---|---|
| 36 | Bismuth trioxide | 2788 |
| 37 | Bismuth subcarbonate | 2559 |
| 38 | Bismuth hydroxide | 2528 |
| 39 | Bismuth subnitrate | 2361 |
| 40 | Bismuth oxychloride | 2083 |
| 41 | None (control)[a] | 1622 |

[a]25 wt % corundum, 17.5 wt % potash feldspar, 57.5 wt % clay.

The foregoing detailed description of the invention includes passages which are chiefly or exclusively concerned with particular parts or aspects of the invention. It is to be understood that this is for clarity and convenience, that a particular feature may be relevant in more than just passage in which it is disclosed, and that the disclosure herein includes all the appropriate combinations of information found in the different passages. Similarly, although a feature may have been described in the context of a particular specific embodiments of the invention, it is to be understood that such feature can also be used, to the extent appropriate, in the context of another embodiment, in combination with another feature, or in the invention in general.

What is claimed is:

1. A high strength porcelain for use as an insulator or a structural ceramic, comprising 9 to 55 % by weight of $SiO_2$, 36 to 87% by weight of $Al_2O_3$, 0 to 2.0% by weight of $Fe_2O_3$, 0 to 1.0% by weight of $TiO_2$, 0 to 0.5% by weight of CaO, 0 to 0.5% by weight of MgO, 1.0 to 4.0% by weight of $K_2O$ and $Na_2O$ combined, and 0.25 to 25.0% by weight of bismuth oxide, the %'s by weight being based on the combined weights of $SiO_2$, $Al_2O_3$, $Fe_2O_3$, $TiO_2$, CaO, MgO, $K_2O$, $Na_2O$, and bismuth oxide, said porcelain having corundum and mullite crystalline phases in a glassy matrix and having an unglazed bending strength greater than 2000 $kg/cm^2$.

2. A porcelain according to claim 1, consisting essentially of $SiO_2$, $Al_2O_3$, $Fe_2O_3$, $TiO_2$, CaO, MgO, $K_2O$ $Na_2O$ and bismuth oxide.

3. A porcelain according to claim 1, having an unglazed bending strength greater than 2800 $kg/cm^2$.

* * * * *

UNITED STATES PATENT AND TRADEMARK OFFICE
CERTIFICATE OF CORRECTION

PATENT NO. : 5,461,015
DATED : October 24, 1995
INVENTOR(S) : Kinsman et al

It is certified that error appears in the above-indentified patent and that said Letters Patent is hereby corrected as shown below:

Column 1, line 5 replace "relays" to --relates--.
Column 1, after line 6, insert -Background of the Invention--

Column 2, line 31, replace $Al_2 Si_2OS(OH)_4$) by-- $Al_2Si_2O_5(OH)_4$)--.
Column 7, Table 2, under Column "Bending Strength ($kg/cm^2$)", line 14, replace "3L%" by--3156--.

Signed and Sealed this

Nineteenth Day of March, 1996

Attest:

BRUCE LEHMAN

Attesting Officer     Commissioner of Patents and Trademarks